Patented June 12, 1934

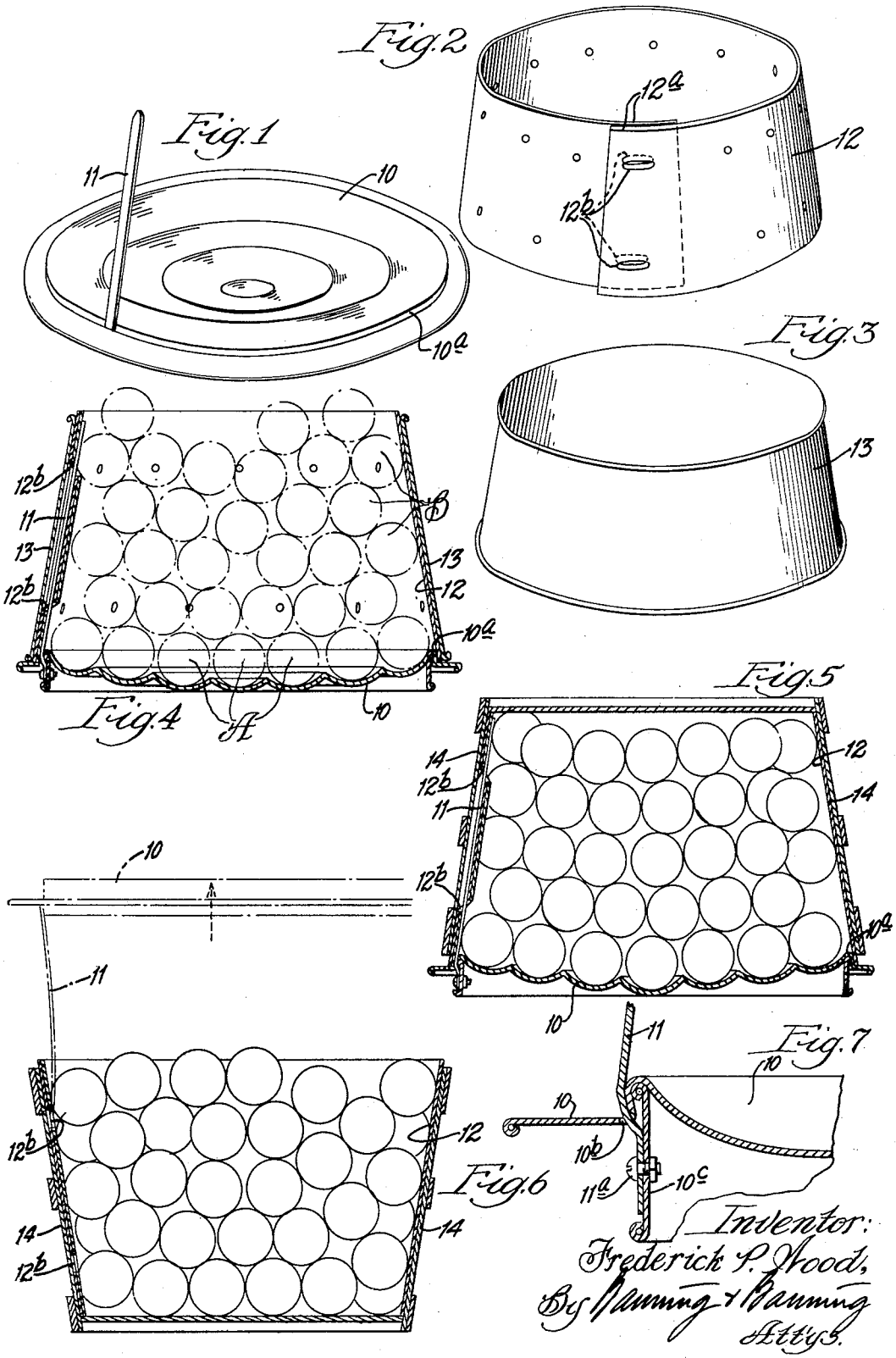

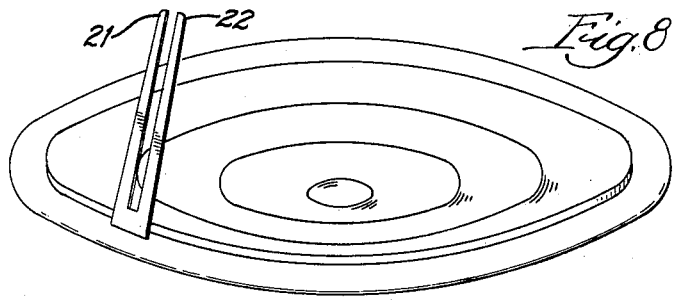
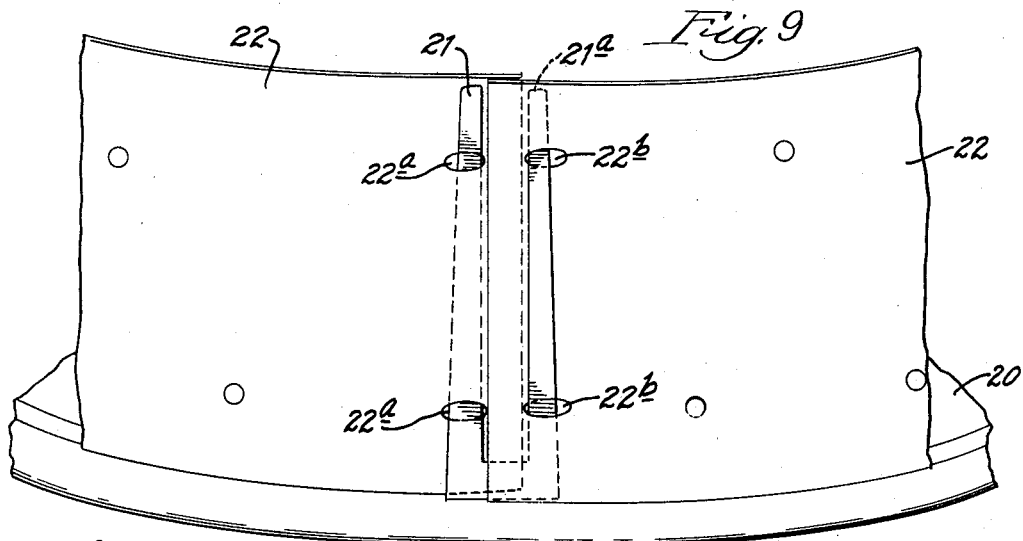
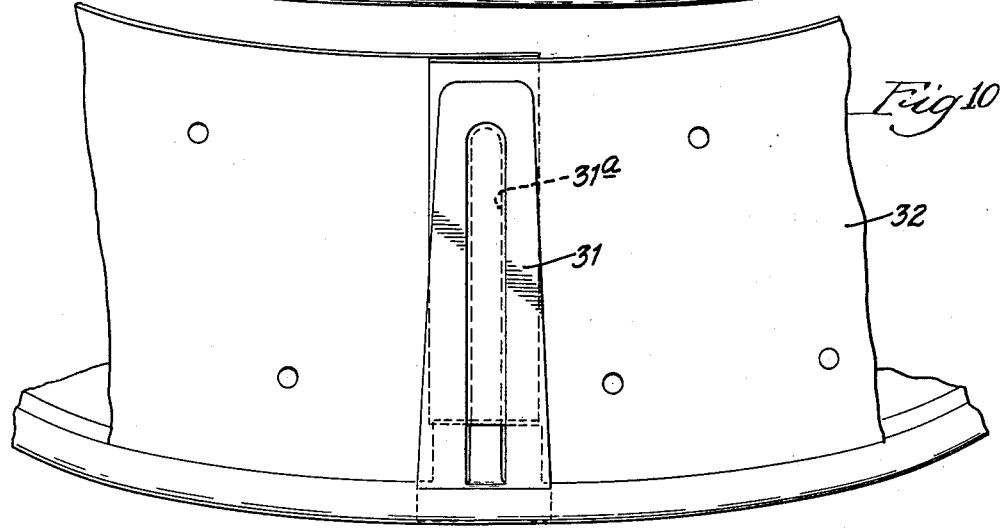

1,962,886

UNITED STATES PATENT OFFICE 1,962,886

PACKING FRUIT

Frederick P. Wood, Adrian, Mich., assignor, by mesne assignments, to Rice, Trew & Rice Company, Biglerville, Pa., a corporation of Pennsylvania Application July 12, 1930, Serial No. 467,477

3 Claims. (Cl. 226—17)

This invention relates to liners or baskets in which may be packed fruits, vegetables, and the like, and to the method of and apparatus for assembling the basket and line, and for filling the same with contents as desired.

An object of this invention is to simplify the apparatus required, as well as the filling operation. Another object is to provide a simplified form of basket liner, and one which is inexpensive to manufacture and easy to handle, ship, and use. These and other objects, as will hereinafter appear, are accomplished by this invention which is fully described in the following specification and shown in the accompanying drawings, in which—

Figure 1 is a perspective view of a face plate to which a liner may be applied in the first stage of a packing operation;

Fig. 2 is a similar view of a liner adapted for co-operation with a face plate such as is shown in Fig. 1;

Fig. 3 shows in perspective a supporting shell adapted to surround the liner during the packing operation;

Fig. 4 is a cross sectional view showing the face plate, liner, and supporting shell in operative position with fruit or other contents packed therein;

Fig. 5 is a view similar to Fig. 4 showing the supporting shell removed, and a basket placed over the fruit;

Fig. 6 which is a view similar to Fig. 5 shows the basket and fruit reversed in position with the face plate in process of being removed therefrom;

Fig. 7 is a partial enlarged detail of the attachment of the locking prong to the face plate;

Fig. 8 is a view similar to Fig. 1, showing a modified form of prong upstanding from the face plate;

Fig. 9 is a fragmentary enlarged perspective view showing the prong of Fig. 7 in operative position to retain the ends of the liner in place; and Fig. 10 is a view similar to Fig. 8 showing another form of liner and locking clip therefor.

The embodiment of Figs. 1 to 6 comprises a face plate 10 having a lock in the form of an upstanding prong 11, preferably flat as shown, adapted to secure the ends of a flexible liner 12 which is surrounded by a supporting shell 13 during the filling operation. This shell is later removed and replaced by a fruit basket, or the like, in which the fruit is to be packed, as will later be described.

The operator first places the face plate on a suitable table or rack (not shown), and carefully arranges thereon the first layer of fruit or vegetables A. Upon the plate and around the fruit layer he places the liner 12 which is curved into the form of a band with its overlapped ends $12^a$ provided with registering openings $12^b$, locked by the prong 11 upon which the liner ends are threaded, as shown in Fig. 4. This liner may be made of any suitable material, such as a fibrous, fabric, or metallic substance having the requisite bendability and strength to conform to the shape desired.

The face plate is provided with a ledge $10^a$ about which the lower part of the liner 12 is rested so as to position it concentrically in place. The supporting shell 13, usually made of sheet metal, is then placed over the liner 12, as shown in section in Fig. 4. Fruit B is now added until the liner is completely filled, as shown in Fig. 4. The liner thus being filled with fruit, vegetables, or the like, in column formation the shell 13 is removed. Over the liner which retains the column of fruit, an upside down basket 14, conforming in shape and size to the liner, is then arranged, as shown in Fig. 5. The basket with the face plate still in place is then inverted so as to assume the usual carrying position, shown in Fig. 6, after which the face plate is removed, together with the prong 11 which withdraws from the openings $12^b$.

The ends of the liner being thus released by the removal of the prong are free to slide circumferentially as required for adjustment by any inequalities within the basket. Thus it will be seen that a very simple form of basket liner is provided, as well as a very simple and efficient method of filling the same. This liner may advantageously be shipped flat, it being unnecessary to bend it into circular or band form until a packing operation is to be performed.

The prong 11, as shown in Fig. 7, passes through an opening $10^b$ in the face plate, and is secured to the flange $10^c$ forming a support for the face plate by means of a bolt $11^a$, or the like. Thus, the prong may be easily and quickly removed so as to lie flat for shipment, and may be readily reassembled for use. When so assembled, the prong is supported also by the opening $10^b$ through which it passes, and it has a bearing both above and below the retaining bolt.

In Figs. 8 and 9 is shown a modified form of the device, in which the face plate 20 similar to that shown in Fig. 1, is provided with a bar slotted to provide two prongs 21 and $21^a$ which extend upwardly therefrom, the prong 21 being adapted to pass through openings 22ª in one end of the liner 22, while the prong 21ª passes through similar openings 22ᵇ in the other end of the liner. Such a construction has the advantage, among others, of using a minimum of material in the liner as the amount of overlap of its ends, as shown by Fig. 8, can be reduced materially.

In Fig. 10 is shown still another modification of the liner, and a face plate providing a support therefor. In this construction, the face plate 30 furnishes a base from which upstands a clip 31 having a central spring tongue 31ª so as to permit the overlapping ends 32ª of the liner 32 to be forced down between the tongue 31ª and the clip body whereby to frictionally retain the liner ends in position with respect to each other, and to the face plate.

Having thus assembled the liner 22 upon the face plate 20, or the liner 32 upon the face plate 30, the supporting shell may be placed over the liner, which is then filled with fruit, as has previously been described with respect to Fig. 4. The next step is removal of the shell and positioning of the basket 14 placed over the liner and the column of supported fruit thereby. The basket with its contents may now be inverted, and the face plate, together with its locking bar or clip, removed as before. This construction is advantageous because the liner requires no perforations in its ends, which are retained solely by friction furnished by the clip.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A packing apparatus including a face plate provided with a one-piece spring lock adjacent its periphery adapted to exert radial pressure from opposite directions upon opposed faces of overlapped free ends of a liner when positioned upon the face plate.

2. A packing apparatus including a face plate, a lock adjacent the periphery of the face plate adapted to exert radial pressure from opposite directions upon opposed faces of overlapped free ends of a liner when positioned upon the face plate, and a supporting shell adapted to rest upon the face plate and surround the liner closely without interference with the lock.

3. A packing apparatus including a face plate, spaced means adjacent the periphery of the face plate between which may be arranged the overlapped ends of a liner adapted to be positioned upon the face plate, the spaced means serving to frictionally hold the liner ends together whereby to sustain the liner in the general form of a cylinder upon the plate, and a supporting shell adapted to rest upon the face plate and surround the liner closely without interference with the lock.

FREDERICK P. WOOD.